United States Patent
Yamamura et al.

(10) Patent No.: US 8,683,474 B2
(45) Date of Patent: Mar. 25, 2014

(54) ACCOUNTING APPARATUS AND METHOD FOR SMT PROCESSOR

(75) Inventors: Shuji Yamamura, Kawasaki (JP); Kouichi Kumon, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 2027 days.

(21) Appl. No.: 11/362,406

(22) Filed: Feb. 27, 2006

(65) Prior Publication Data

US 2006/0242642 A1 Oct. 26, 2006

(30) Foreign Application Priority Data

Mar. 31, 2005 (JP) ................................. 2005-100951

(51) Int. Cl.
*G06F 9/46* (2006.01)
*G06F 15/76* (2006.01)

(52) U.S. Cl.
USPC ................. 718/104; 712/20; 712/32; 712/39; 712/43

(58) Field of Classification Search
None
See application file for complete search history.

(56) References Cited

U.S. PATENT DOCUMENTS

| | | | | |
|---|---|---|---|---|
| 5,809,268 | A * | 9/1998 | Chan .............................. | 712/200 |
| 6,401,240 | B1 * | 6/2002 | Summers ....................... | 717/130 |
| 6,738,730 | B2 * | 5/2004 | Sato et al. ...................... | 702/182 |
| 6,813,760 | B1 * | 11/2004 | Fitzel et al. .................... | 717/131 |
| 7,058,824 | B2 * | 6/2006 | Plante et al. ................... | 713/300 |
| 7,197,652 | B2 * | 3/2007 | Keller et al. ................... | 713/320 |
| 7,421,592 | B1 * | 9/2008 | Kadatch et al. ............... | 713/300 |
| 7,426,731 | B2 * | 9/2008 | Findeisen ....................... | 718/104 |
| 7,472,258 | B2 * | 12/2008 | Burky et al. ................... | 712/218 |
| 2002/0194251 | A1 * | 12/2002 | Richter et al. ................. | 709/105 |
| 2003/0055602 | A1 * | 3/2003 | Sato et al. ...................... | 702/182 |
| 2004/0216105 | A1 * | 10/2004 | Burky et al. ................... | 718/100 |
| 2004/0216113 | A1 * | 10/2004 | Armstrong et al. ........... | 718/104 |
| 2005/0125314 | A1 * | 6/2005 | Agarwal et al. ................ | 705/30 |
| 2005/0198635 | A1 * | 9/2005 | Olszewski et al. ............ | 718/100 |

FOREIGN PATENT DOCUMENTS

| | | |
|---|---|---|
| JP | 11-282903 | 10/1999 |
| JP | 2004-252670 | 9/2004 |
| WO | WO 2004/088518 | 10/2004 |

OTHER PUBLICATIONS

Japanese Notification of Reasons for Rejection Office Action issued on Dec. 2, 2008 in corresponding Japanese Patent Application 2005-100951.

Maurice J. Bach, "The Design of the UNIX Operating System", Process Scheduling and Time, Prentice-Hall, Inc., Chapter 8.1, pp. 248-259 (1986).

\* cited by examiner

*Primary Examiner* — Abdullah Al Kawsar
(74) *Attorney, Agent, or Firm* — Staas & Halsey LLP

(57) ABSTRACT

In an accounting apparatus, a conflict determination unit determines whether or not the accounting mode is in a conflict state where a process is executing in another logical CPU and stores the determination result in an accounting information storage unit, when a process of the user starts to be executed in a logical CPU of an SMT processor. And a CPU use time acquisition unit collects the CPU use time of the process in the conflict state or the non-conflict state distinctively and stores it in an accounting information storage unit. Thereafter, a CPU use time conversion unit converts the CPU use time in the conflict state, with a predetermined weighting, based on the CPU use time in the conflict state and the non-conflict state, after the end of executing the process, and an accounting calculation unit calculates the accounting amount for the process from an effective use time.

14 Claims, 10 Drawing Sheets

FIG.4

| | CONFLICT | | NON-CONFLICT | | TOTAL [SEC] | CONVERSION TIME [SEC] | EFFECTIVE TIME [SEC] | ACCOUNTING AMOUNT [YEN] |
|---|---|---|---|---|---|---|---|---|
| | CPU TIME [SEC] | CPI | CPU TIME [SEC] | CPI | | | | |
| PROCESS p1 | 10 | 2.6 | 20 | 1.1 | 30 | 4.2 | 24.2 | 242 |
| PROCESS p2 | 320 | 3.1 | 40 | 1.2 | 360 | 123.9 | 163.9 | 1,639 |
| PROCESS p3 | 200 | 6.7 | 100 | 2.0 | 300 | 59.7 | 159.7 | 1,597 |

ACCOUNTING UNIT: 10 YEN/SEC

FIG.5

| | CONFLICT [SEC] | NON-CONFLICT [SEC] | TOTAL [SEC] | CONVERSION TIME [SEC] | EFFECTIVE TIME [SEC] | ACCOUNTING AMOUNT [YEN] |
|---|---|---|---|---|---|---|
| PROCESS p1 | 10 | 20 | 30 | 5 | 25 | 250 |
| PROCESS p2 | 320 | 40 | 360 | 160 | 200 | 2,000 |
| PROCESS p3 | 200 | 100 | 300 | 100 | 200 | 2,000 |

ACCOUNTING UNIT: 10 YEN/SEC

FIG.8

| | ALU CONFLICT | FPU CONFLICT | ... | NON-CONFLICT | TOTAL [SEC] | EFFECTIVE TIME [SEC] | ACCOUNTING AMOUNT [YEN] |
|---|---|---|---|---|---|---|---|
| | CPU TIME [SEC] | CPU TIME [SEC] | ... | CPU TIME [SEC] | | | |
| PROCESS p1 | 0.5 | 3.5 | ... | 20.0 | 24.0 | 22.0 | 220 |
| PROCESS p2 | 200.5 | 1.0 | ... | 40.0 | 241.5 | 140.8 | 1,408 |
| PROCESS p3 | 120.5 | 0.0 | ... | 100.0 | 220.5 | 160.3 | 1,603 |

ACCOUNTING UNIT: 10 YEN/SEC

FIG.9A

```
void update_one_process(struct task_struct *p,
struct kernel_stat_tick_times *time, int cpu)
{
kernel_timeval_add_usec(&p->per_cpu_utime[cpu],
time->u_usec +time->n_usec);
    if (p->isConflict)
kernel_timeval_add_usec(&p->conf_per_cpu_utime[cpu],
time->u_usec + time->n_usec);
do_process_times(p, time);
}
```

FIG.9B task_struct STRUCTURE

`kernel_timeval per_cpu_utime[]`

(USER USE TIME FOR EACH CPU)

`kernel_timeval conf_per_cpu_utime[]`

(CONFLICT USER USE TIME FOR EACH CPU)

`int isConflict`

(ACCOUNTING MODE)

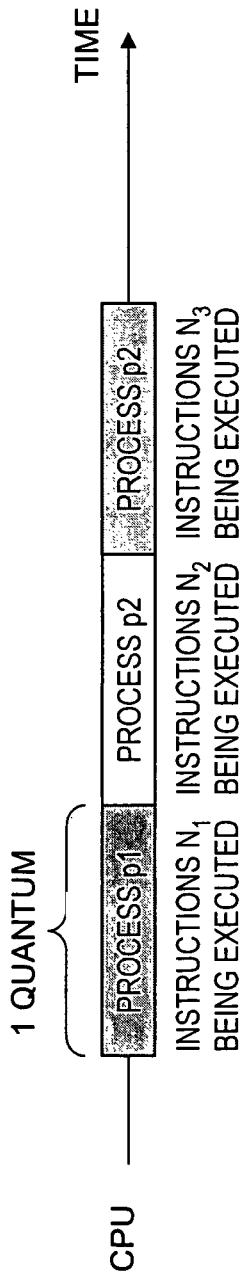
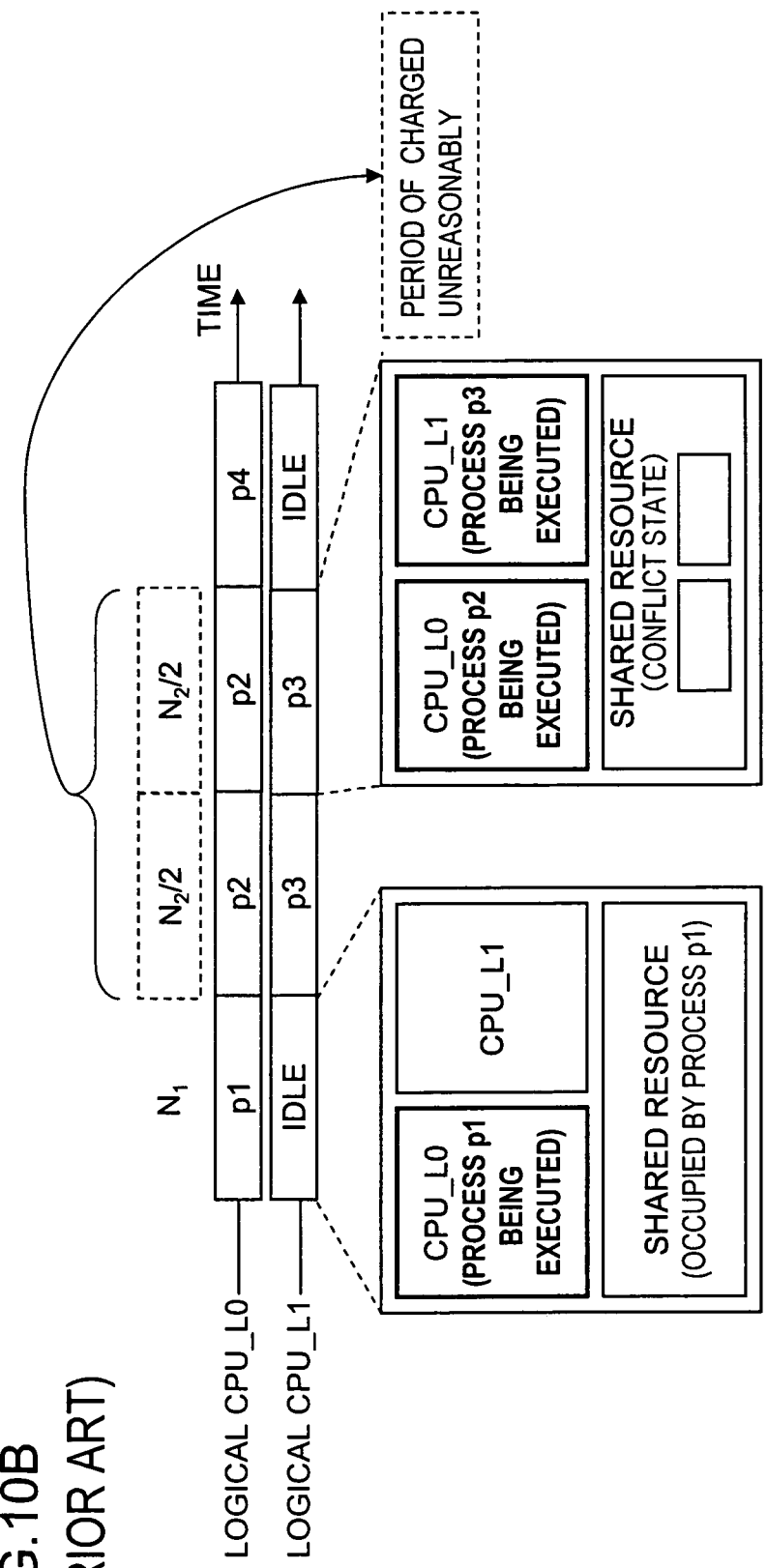
FIG.10A (PRIOR ART)
FIG.10B (PRIOR ART)

ACCOUNTING APPARATUS AND METHOD FOR SMT PROCESSOR

CROSS-REFERENCE TO RELATED APPLICATIONS

This application claims priority from Japanese patent application Serial no. 2005-100951 filed on Mar. 31, 2005, the contents of which are herein incorporated by reference.

BACKGROUND OF THE INVENTION

1. Field of the Invention

This invention relates to an accounting technique for an SMT (Simultaneous Multi-Threading) processor. More particularly, the present relates to an accounting technique based on information that shows substantial use of the computing resources for a user program executed on the SMT processor.

2. Description of the Related Art

The SMT processor shares a set of computing resources (hardware resources) such as an arithmetic operation unit, a cache memory and a bus unit with the logical processors constructed as an instruction sequencer composed of an instruction fetch unit, an instruction decode unit and an instruction issue unit, in which the logical processors execute a plurality of programs, or instruction streams at the same time to improve the throughput per physical CPU.

In recent years, the SMT processor has appeared in the server field, whereby there is a demand for an accounting system for the user program in the SMT processor. In a CPU making no parallel processing at the instruction level for a processor (hereinafter called a non-SMT processor), a process occupies the CPU for an allocated quantum. Therefore, in accounting for the user program, it is possible to charge any process fairly by an OS (Operating System) measuring the CPU time allocated to the process (e.g., refer to non-patent document 1, Maurice. J. Bach, "The Design of the UNIX operating System", Prentice-Hall, Inc, Chapter 8.1 p. 248-257, 1986").

However, in the SMT processor, two or more logical processors are constructed, each logical processor being allocated a process separately and independently, so that the utilization state of hardware resources may change. Therefore, a conventional accounting system employing the CPU time allocated by the OS can not be applied to the accounting process of the SMT processor.

Referring to FIGS. 10A and 10B, a difference in the process execution between SMT processor and non-SMT processor will be described below. FIG. 10A shows an example of process execution in the non-SMT processor, and FIG. 10B shows an example of process execution in the SMT processor in which two logical processors are constructed.

In the non-SMT processor as shown in FIG. 10A, one process is allocated one quantum. The processor executes the instructions of process p1, process p2, process p3 and so on in the order allocated by the OS.

On the other hand, the SMT processor as shown in FIG. 10B has a state (conflict state) where two logical processors (L0, L1) execute respective processes to employ the shared resources conflictly and a state (non-conflict state) where only one logical processor of two logical processors (L0, L1) executes the process to employ the shared resources exclusively. That is, in a certain quantum, when the logical processor (L0) is executing process p1 and the logical processor (L1) is in an idle state, process p1 of the logical processor L0 uses the shared resources exclusively. However, in the next quantum, when the logical processor (L0) executes process p2, the shared resources are shared between two logical processors, if the logical processor (L1) executes process 3 at the same time.

In such a conflict state where two or more logical processors execute the processes at the same time and employ one hardware resource at the same time, the performance of the resource that can be employed by each logical processor is lower in proportion to the number of logical processors in the conflict state.

In the SMT processor as shown in FIG. 10B, the usable shared resources become ½ in the worst case, whereby the logical processor L0 and L1 can treat only half the number of instructions per quantum as compared with process execution in the non-conflict state. That is, it is required that the time during which process p2 is executing is twice the time during which it is executing in the non-conflict state. This means that the substantial performance of the processor decreases in the conflict state from the viewpoint of a certain process to extend the process execution time. Therefore, there is a problem that process p2 and process p3 are charged unreasonably high, if the accounting is made based on the CPU time allocated by the OS as conventionally conducted.

The invention is intended to realize a fair accounting system for the user program executed on the SMT processor. It is an object of the invention to provide an accounting technique that can make the accounting based on to what extent the user program executed on the SMT processor substantially employs the performance of physical processor and the shared resources to enjoy the performance of CPU.

SUMMARY OF THE INVENTION

The present invention provides an accounting apparatus for a user program executed on an SMT processor comprises a conflict determination unit for determining whether the accounting mode is in a conflict state where a process is executing in another logical processor or a non-conflict state other than the conflict state, and setting either the conflict state or the non-conflict state as the determination result in a conflict state storage unit, when a process of the user program starts to be executed in a logical processor, a CPU use time acquisition unit for collecting the time during which the process of the user program uses the logical processor, and storing distinctively a conflict CPU use time on execution in the conflict state and a non-conflict CPU use time on execution in the non-conflict state in a CPU use time storage unit by referring to the conflict state storage unit, and an accounting calculation unit for calculating the accounting amount distinctively for execution of the user program in the conflict state and execution of the user program in the non-conflict state, based on the conflict CPU use time and the non-conflict CPU use time read from the CPU use time storage unit, after execution of the process of the user program is ended.

In this invention, when a process of the user program starts to be executed in a logical processor on the SMT processor, a determination is made whether the accounting mode is a conflict state where a process is executing in another logical processor or a non-conflict state other than the conflict state, and the determination result is set in a conflict state storage unit. And the time during which the process of the user program uses the logical processor is collected, and the collected CPU use time is stored as a conflict CPU use time in a CPU use time storage unit, if the process is executing in the conflict state by referring to the conflict state storage unit. On the other hand, if the process is executing in the non-conflict state, the collected CPU use time is stored as a non-conflict CPU use time in the CPU use time storage unit. And the accounting amount is calculated distinctively for execution of the user program in the conflict state and execution of the user program in the non-conflict state, based on the conflict CPU use time and the non-conflict CPU use time read from the CPU use time storage unit, after execution of the process of the user program is ended.

Thereby, it is possible to achieve a fairer accounting process in consideration of the conflict state during execution of the process even in the SMT processor in which the process execution time of the user program is largely changed depending on whether the logical processor is in the conflict state or the non-conflict state.

Also, the invention provides the accounting apparatus for SMT processor with the above configuration, further comprises a use time conversion unit for calculating a CPU conversion use time that is a substantial use time of executing the process of the user program, based on the conflict CPU use time, employing a predetermined weighting value, in which the accounting calculation unit calculates a CPU effective use time, based on the CPU conversion use time and the non-conflict CPU use time read from the CPU use time storage unit, and calculates the accounting amount from the CPU effective use time in a predetermined unit cost of accounting.

Thereby, it is possible to achieve a fairer accounting process by converting the CPU use time in the conflict state into the CPU use time in the non-conflict state to account for the user program.

Also, the invention provides the accounting apparatus for SMT processor, further comprises a CPU use information acquisition unit for collecting the CPU information that is performance index of the logical processor executing the process from the start of executing the process of the user program, and storing distinctively the conflict CPU information on execution in the conflict state and the non-conflict CPU information on execution in the non-conflict state in the CPU information storage unit by referring to the conflict state storage unit, in which the use time conversion unit calculates the CPU conversion use time that is the substantial use time in executing the process of the user program, based on the conflict CPU use time read from the CPU use time storage unit, employing a ratio of the conflict CPU information to the non-conflict CPU information read from the CPU information storage unit.

Thereby, it is possible to achieve a fairer accounting process by converting the CPU use time in the conflict state into the CPU use time in the non-conflict state, based on the performance index of the CPU, such as CPI information (number of clock cycles per instruction) or number of executed instructions per unit period to account for the user program.

Further, the invention provides an accounting apparatus for a user program executed on an SMT processor, comprises a resource state information acquisition unit for collecting the resource state information regarding the utilization state of hardware resources for the SMT processor that is executing each process of the user program in a logical processor and storing it in a resource state information storage unit, a CPU use time acquisition unit for collecting a CPU use time during which the process of the user program uses the logical processor, and storing it in a CPU use time storage unit, and an accounting calculation unit for determining whether each process of the user program is in a conflict state where the process is executing in another logical processor or a non-conflict state other than the conflict state, employing the resource state information of each process read from the resource state information acquisition unit, distinguishing the CPU use time read from the CPU use time storage unit into the CPU use time in the conflict state and the CPU use time in the non-conflict state, and calculating the accounting amount distinctively for the CPU use time in the conflict state and the CPU use time in the non-conflict state, after the end of executing the process of the user program.

In the present invention, the resource state information regarding the utilization state of hardware resources for the SMT processor that is executing each process of the user program in a logical processor is collected and stored in a resource state information storage unit. Further, the CPU use time during which the process of the user program uses the logical processor is collected, and stored in a CPU use time storage unit.

And after the end of executing the process of the user program, a determination is made whether each process of the user program is in a conflict state or a non-conflict state, employing the resource state information of each process read from the resource state information acquisition unit. And the CPU use time read from the CPU use time storage unit is distinguished into the CPU use time in the conflict state and the CPU use time in the non-conflict state, based on the determination result, to calculate the accounting amount distinctively for the CPU use time in the conflict state and the CPU use time in the non-conflict state.

Even if the processes are executing on two or more logical processors at the same time, the lower performance may not be caused in the conflict state, depending on which unit of the shared resources the instruction of each process is inputted into. For example, there may be substantial less influence of the conflict in a state where one conflicting process employs an ALU, and the other process employs a load/store unit. Thus, the accounting is achieved taking into consideration a substantial conflict state degrading the performance in executing the process, employing the state information of the shared resources for the SMT processor. Thereby, it is possible to achieve an accounting process with higher precision by reflecting the utilization state of physical shared resources.

Moreover, the accounting apparatus of the present invention may further comprise a program utilization accounting calculation unit for calculating the utilization accounting amount of the user program distinctively for execution of the user program in the conflict state and execution of the user program in the non-conflict state, based on the CPU use time read from the CPU use time storage unit. Thereby, it is possible to account for the utilization charge of an application program in the SMT processor.

Also, the present invention may be implemented as an method that is performed by the elements and processing means of the above accounting apparatus.

Also, the invention may be implemented as a program that is read and executed by a computer. The program according to the invention may be stored in an appropriate computer readable recording medium, such as a portable medium memory, a semiconductor memory or a hard disk, and provided in the form of the recording medium or distributed via a communication interface over the communication network.

With the invention, it is possible to achieve a fairer accounting process in consideration of the conflict state during execution of the process in the SMT processor in which the process execution time of the user program is largely changed depending on whether the logical processor is in the conflict state or the non-conflict state.

Particularly, since the user program is accounted based on the conversion use time in which the CPU use time in the conflict state is converted into the CPU use time in the non-conflict state, it is possible to achieve a fairer accounting process.

Also, with the invention, since the CPU use time in the conflict state is converted into the CPU use time in the non-conflict state employing the information indicating the performance index of the CPU, such as CPI information (number of clock cycles per instruction) or the number of executed instructions per unit period, and the user program is accounted based on this conversion use time, it is possible to achieve a fairer accounting process.

Also, with the invention, it is possible to achieve an accounting process with higher precision by reflecting the utilization state of physical shared resources in consideration of a substantial conflict state degrading the performance in executing the process, employing the state information of shared resources for the SMT processor.

Also, with the invention, since the CPU conversion use time converted from the CPU use time in the conflict state is utilized to calculate a performance improvement ratio of the SMT processor, it is possible to calculate the performance improvement ratio at higher precision or dynamically determine the performance improvement ratio.

BRIEF DESCRIPTION OF THE DRAWINGS

FIG. 4 is a view showing an example of accounting calculation information including CPU information in a table format according to the first embodiment;

FIG. 5 is a view showing an example of accounting calculation information in a table format according to the first embodiment;

FIG. 8 is a view showing an example of accounting calculation information in a table format according to the second embodiment;

FIGS. 9A and 9B are views showing an example of accounting information in the CPU use time acquisition unit and the accounting information storage unit according to another embodiment of the invention; and FIGS. 10A and 10B are views for explaining differences in process execution between the SMT processor and the non-SMT processor.

DETAILED DESCRIPTION OF THE PREFERRED EMBODIMENTS

The preferred embodiments of the present invention will be described below.

Figure 1:
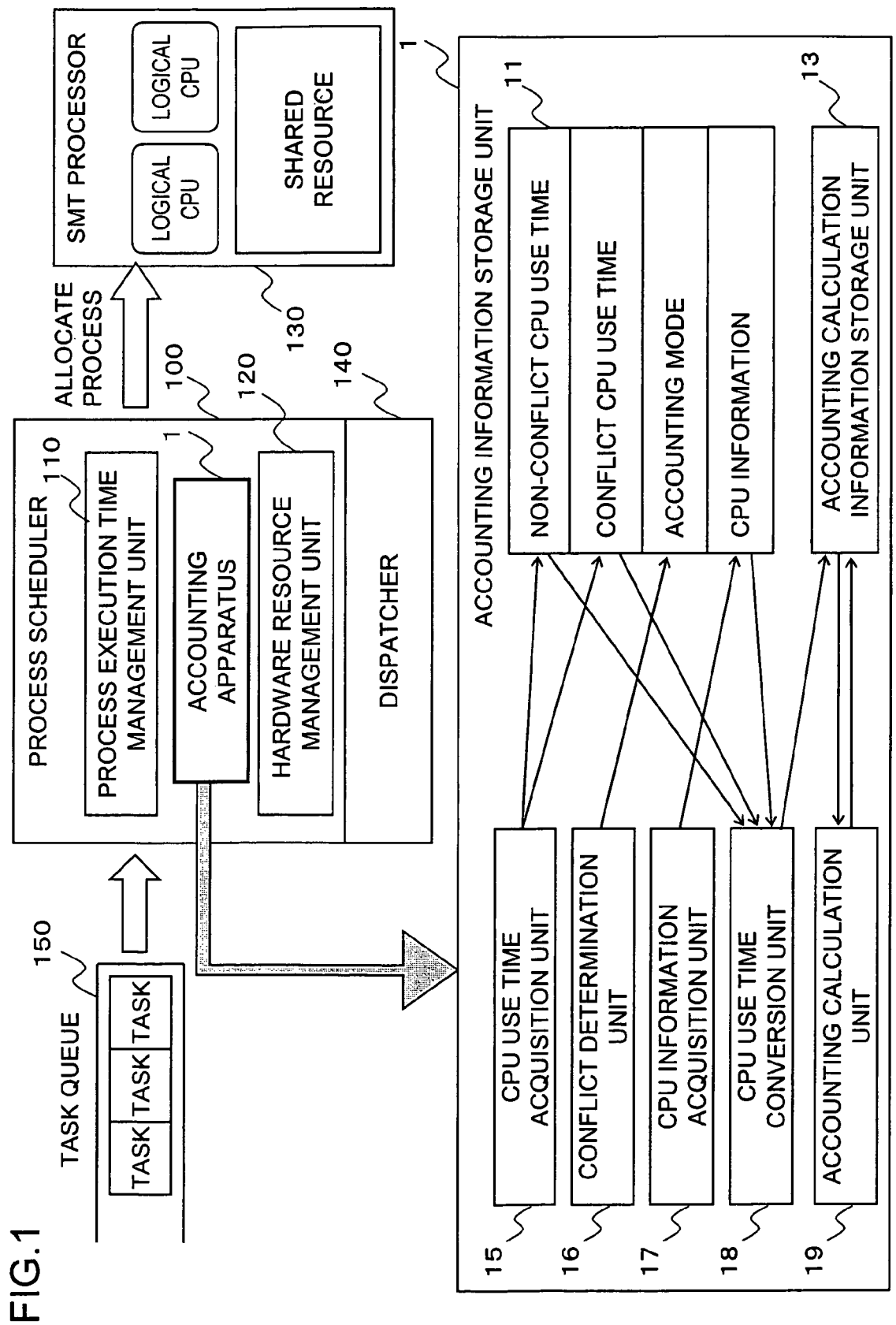
FIG. 1 is a diagram showing an example of configuration according to a first embodiment of the present invention.

FIG. 1 is a view showing an example of configuration according to a first embodiment of the invention. An accounting apparatus 1 of the invention is performed by a program built in a process scheduler 100 of an OS (Operating System) in a computer. The process scheduler 100 is processing means for managing the allocation of a process for each quantum to a virtual logical processor (hereinafter referred to as a logical CPU) constructed in one physical SMT processor 130 by a general TSS (Time Scheduling System). The quantum is a time unit of allocation to the logical CPU managed by the OS, for example, 1 quantum=10 ms.

The process scheduler 100 comprises a process execution time management unit 110 for managing how many quantums are allocated to the process, and a hardware resource management unit 120 for managing the computing resources (shared resources) shared between the logical CPUs of the SMT processor 130.

A dispatcher 140 is processing means for switching a task (process) to be inputted into the logical CPU from among the tasks waiting for execution to be stored in a task queue 150 in accordance with a judgment of the process scheduler 100.

The accounting apparatus 1 comprises an accounting information storage unit 11, an accounting calculation information storage unit 13, a CPU use time acquisition unit 15, a conflict determination unit 16, a CPU information acquisition unit 17, a CPU use time conversion unit 18 and an accounting calculation unit 19.

The accounting information storage unit 11 is processing means for storing, for each process, the information useful for accounting, such as non-conflict CPU use time, conflict CPU use time, accounting mode, and CPU information.

The accounting mode is an item of recording either the conflict state where a plurality of logical CPUs for the SMT processor 130 execute the process and share the shared resources or the non-conflict state where only one logical CPU executes the process and exclusively uses the shared resources.

The non-conflict CPU use time is an item of recording the time during which the accounting mode uses the logical CPU in the non-conflict state in executing the process of the user program. The conflict CPU use time is an item of recording the time during which the accounting mode uses the logical CPU in the conflict state in executing the process of the user program.

The CPU information is an item of recording the CPU information that is performance index of the logical CPU. The CPU information is recorded distinctively for the CPU information (non-conflict CPU information) in which the accounting mode is the non-conflict state and the CPU information (conflict CPU information) in which the accounting mode is the conflict state.

The accounting calculation information storage unit 13 is processing means for storing the information required for the accounting process that is employed in the accounting calculation unit 19 and the accounting calculation information that is the result of the accounting process. The accounting calculation information includes, for each process, the conflict CPU use time, the non-conflict CPU use time, the total of conflict CPU use time and non-conflict CPU use time, the conversion time of adjusting the CPU use time in the conflict state, the effective time that is the effective CPU use time to be accounted, and the accounting amount calculated based on the effective time.

The CPU use time acquisition unit 15 is processing means for collecting the time during which the logical CPU is used in executing the process of the user program from the process execution time management unit 110, and storing distinctively the conflict CPU use time in which the accounting mode is in the conflict state and the non-conflict CPU use time in which the accounting mode is in the non-conflict state in the accounting information storage unit 11.

The conflict determination unit 16 is processing means for determining whether the process is executing in another logical CPU (conflict state) or not (non-conflict state) when the execution of the process of the user program is started in the logical CPU, and storing the determination result (conflict state/non-conflict state) in the accounting mode of the accounting information storage unit 11.

The CPU information acquisition unit 17 is processing means for collecting the CPU information, such as the number of clock cycles per instruction (CPI) and the number of executed instructions per unit time, and storing distinctively the CPU information in the conflict state (conflict CPU information) and the CPU information in the non-conflict state (non-conflict CPU information) in the CPU information of the accounting information storage unit 11.

The CPU use time conversion unit 18 is processing means for reading the conflict CPU use time from the accounting information storage unit 11, and calculating the CPU conversion use time that is the substantial CPU use time in the conflict state, employing a predetermined weighting value, after the user program is ended. As the predetermined weighting value, the number of logical CPUs capable of executing the process in the conflict state, for example, may be employed.

Also, the CPU use time conversion unit 18 is processing means for reading the CPU information (conflict CPU information and non-conflict CPU information) and the conflict CPU use time from the accounting information storage unit 11, and calculating the CPU conversion use time from the conflict CPU use time, employing a ratio of conflict CPU information to non-conflict CPU information. Also, the CPU use time conversion unit 18 stores the information read from the accounting information storage unit 11 and the processing result in the accounting calculation information storage unit 13.

The accounting calculation unit 19 is processing means for calculating the accounting amount in a predetermined accounting unit, based on the effective time of summing the non-conflict CPU use time of the accounting calculation information storage unit 13 and the CPU conversion use time converted from the conflict CPU use time, and storing the accounting amount in the accounting calculation information storage unit 13, after the user program is ended.

A process example according to the first embodiment of the invention will be described below. In this example, two logical CPUs of the SMT processor 130 as shown in FIG. 1 are supposed the logical CPU_L0 and the logical CPU_L1.

Figure 2:
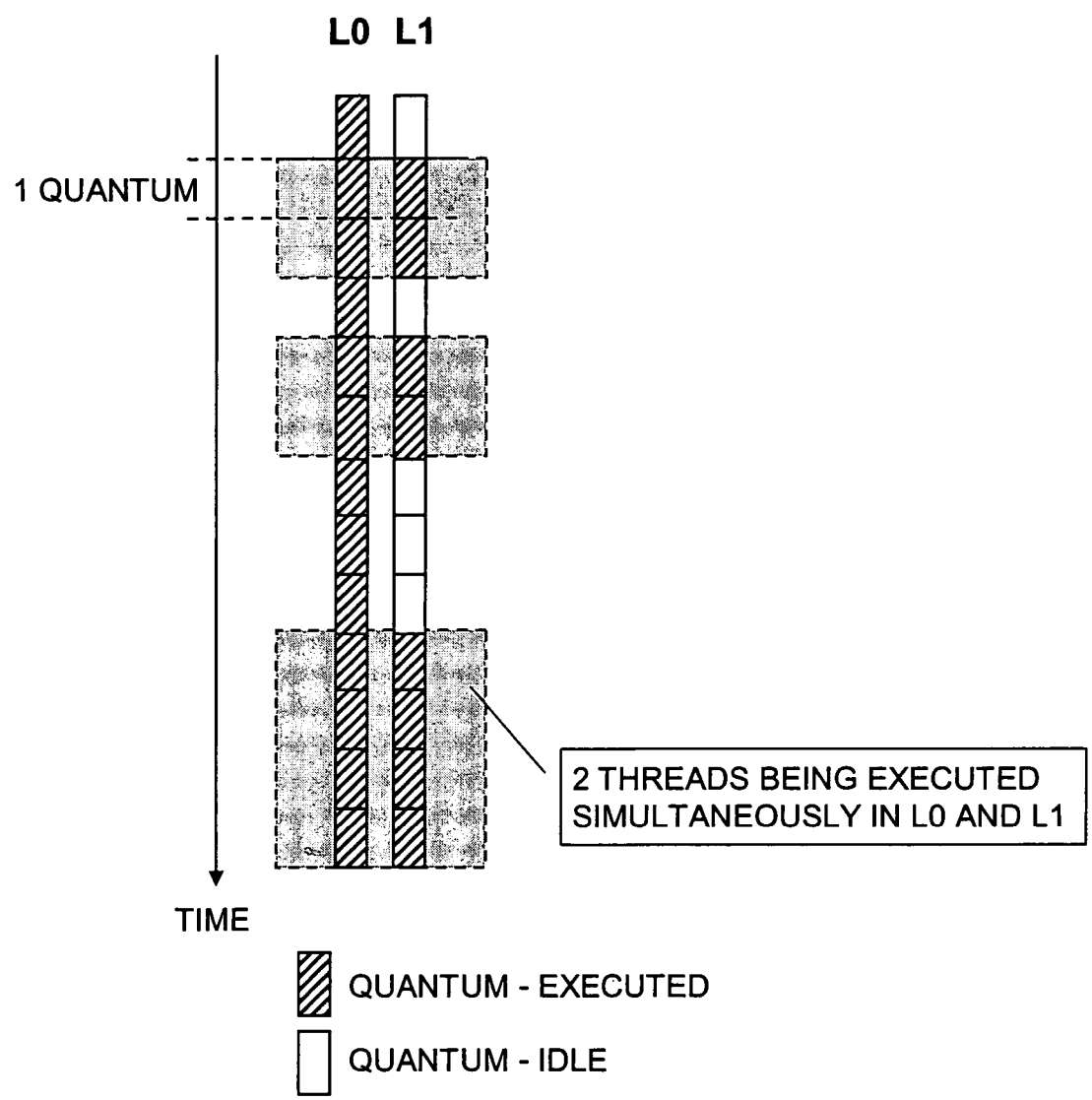
FIG. 2 is a view showing an example of executing the processes in the logical CPU_L0 and CPU_L1 and a conflict state.

FIG. 2 shows an example of executing the processes in the threads of logical CPU_L0 and logical CPU_L1 and the conflict state. In logical CPU_L0 and logical CPU_L1, the process is allocated at a predetermined quantum, and executed. In FIG. 2, the slanting line portion shows the quantum where the process is executed, and the white portion shows the quantum in idle state where the process is not executed. In the thread of logical CPU_L0, the process is executing continuously.

On the other hand, in the thread of logical CPU_L1, the idle state or the process executing state repeatedly occurs in such a way that the process is idle at the first quantum, the process is executing at the second and third quantums, and the process is idle again at the fourth quantum. In two logical CPUs of the SMT processor 130, the conflict state and the non-conflict state are repeated.

Figure 3:
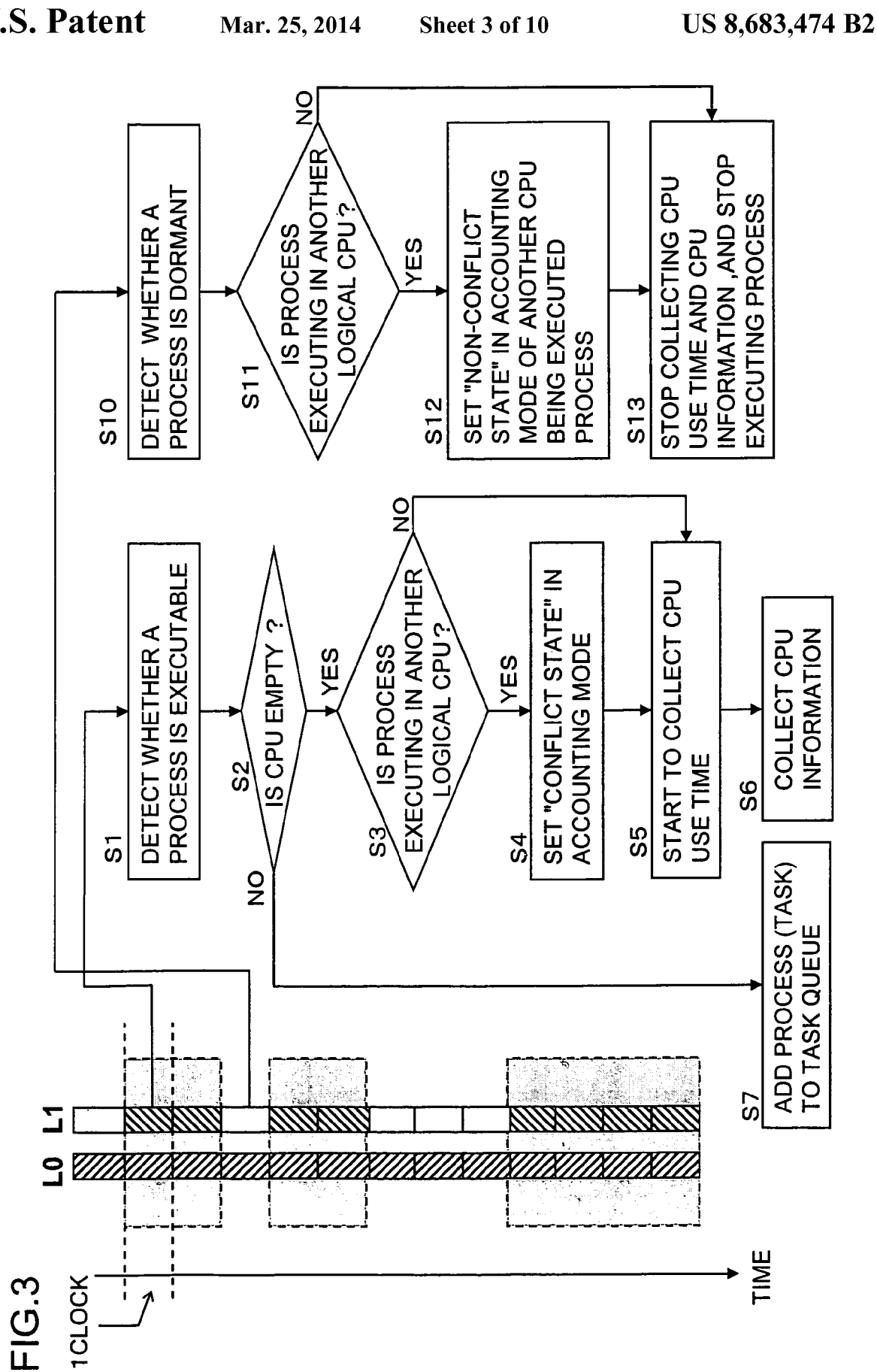
FIG. 3 is a view showing a process flow according to the first embodiment of the invention.

FIG. 3 shows a processing flow according to the first embodiment of the invention.

The conflict determination unit 16 of the accounting apparatus 1 detects that a certain process is executable at the dispatch time of the dispatcher 140 or at a predetermined moment in a timer interrupt process (step S1), and checks whether or not there is any logical CPU not executing the process (empty CPU) at present (step S2). Moreover, if there is any empty CPU (logical CPU_L1 here) (YES at step S2), the conflict determination unit 16 checks via the process scheduler 100 whether or not the process is executing in another logical CPU (logical CPU_L0 here) (step S3). If the process is executing in another logical CPU_L0 (YES at step S3), the conflict determination unit 16 sets the accounting mode of accounting information for the process in the accounting information storage unit 11 to the conflict state (step S4).

And the CPU use time acquisition unit 15 starts to collect the CPU use time (number of clock cycles) from the process execution time management unit 110, and the logical CPU_L1 of the SMT processor 130 executes the process (step S5). Herein, the CPU use time collected by the CPU use time acquisition unit 15 is stored in the conflict CPU use time of the accounting information storage unit 11.

On the other hand, if the process is not executing in another logical CPU_L0 (NO at step S3), the CPU use time acquisition unit 15 starts to collect the CPU use time (number of clock cycles) from the process execution time management unit 110, and the logical CPU_L1 executes the process (step S5). Herein, the CPU use time collected by the CPU use time acquisition unit 15 is stored in the non-conflict CPU use time of the accounting information storage unit 11.

Moreover, the CPU information acquisition unit 17 collects the CPU information such as CPI from the hardware resource management unit 120 (step S6). Herein, the CPU information collected by the CPU information acquisition unit 17 is stored, as the conflict or non-conflict CPU information according to the set accounting mode of the accounting information storage unit 11, in the CPU information of the accounting information storage unit 11.

If there is no empty CPU by checking the logical CPU not executing the process at present (NO at step S2), the dispatcher 140 adds its process (task) to the task queue 150, whereby the accounting apparatus 1 ends the process (step S7).

Thereafter, if the conflict determination unit 16 detects that the process executed by the logical CPU_L1 becomes in a dormant state (step S10), it is checked via the process scheduler 100 whether or not the process is executing in another logical CPU_L0 (step S11). If the process is executing in another logical CPU_L0 (YES at step S11), the accounting mode of accounting information for the process executing in another logical CPU_L0 is set to the non-conflict state (step S12).

And the CPU use time acquisition unit 15 stops collecting the CPU use time (number of clock cycles) from the process execution time management unit 110, and the CPU information acquisition unit 17 stops collecting the CPU information from the hardware resource management unit 120, whereby the process executing in the logical CPU_L1 is stopped (step S13).

On the other hand, if the process is not executing in another logical CPU_L0 (NO at step S11), the CPU use time acquisition unit 15 stops collecting the CPU use time (number of clock cycles) from the process execution time management unit 110, and the CPU information acquisition unit 17 stops collecting the CPU information from the hardware resource management unit 120. And the process executing in the logical CPU_L1 of the SMT processor 130 is stopped (step S13).

Thereafter, if the execution of the user program is ended, the following accounting process is performed.

As one accounting process, the accounting process employing the CPU information will be described below.

The CPU use time conversion unit 18 extracts the accounting information of the process from the accounting information storage unit 11. As the accounting information, the non-conflict CPU use time, the conflict CPU use time, and CPU information (conflict CPU information, non-conflict CPU information) are acquired. Herein, it is supposed that CPI is stored as the CPU information.

The extracted accounting information is as follows.
Conflict CPU use time=10 [sec]
Non-conflict CPU use time=20 [sec]
Conflict CPU information (CPI)=2.6
Non-conflict CPU information (CPI)=1.1

The CPU use time conversion unit 18 decides the weighting value used to calculate the CPU conversion use time in the following way.

$$\text{Weighting value} = \text{non-conflict CPU information/conflict CPU information} = 1.1/2.6 = 0.42$$

Moreover, the CPU conversion use time is calculated from the conflict CPU use time, employing the decided weighting value:

$$\text{CPU conversion use time} = (\text{conflict CPU use time}) \times (\text{weighting value}) = 10 \times 0.42 = 4.2 \text{ [sec]}$$

Thereafter, the CPU use time conversion unit 18 sets the accounting information read from the accounting information storage unit 11 and the calculated CPU conversion use time to the accounting calculation information, and stores it in the accounting calculation information storage unit 13.

FIG. 4 shows an example of accounting calculation information in the table format. The accounting calculation information includes, for each process, the conflict CPU use time (indicated as "CPU time" of "conflict" in FIG. 4), the conflict CPU information (indicated as "CPI" of "conflict" in FIG. 4), the non-conflict CPU use time (indicated as "CPU time" of "non-conflict" in FIG. 4), the non-conflict CPU information (indicated as "CPI" of "non-conflict" in FIG. 4), the CPU conversion use time (indicated as "conversion time" in FIG. 4), the total time of conflict CPU use time and non-conflict CPU use time (indicated as "total" in FIG. 4), the effective time to be accounted, and the calculated accounting amount. The items of the total, the effective time and the accounting amount are treated by the accounting calculation unit 19.

The accounting calculation unit 19 calculates the effective time by summing the CPU conversion use time of the accounting calculation information and the non-conflict CPU use time, and calculates the accounting amount by multiplying the effective time by a predetermined accounting unit. Herein, assuming that the accounting unit is 10 yen/sec, for process p1 as an example, the effective time and the accounting amount are calculated as follows.

$$\text{Effective time} = (\text{CPU conversion use time}) + (\text{Non-conflict CPU use time}) = 4.2 + 20 = 24.2 \text{ [sec]}$$

$$\text{Accounting amount} = (\text{effective time}) \times (\text{accounting unit}) = 24.2 \times 10 = 242 \text{ [yen]}$$

The accounting calculation unit 19 stores the calculated effective time and accounting amount in the accounting calculation information of the accounting calculation information storage unit 13.

Thereby, the conflict state of the logical CPU is correctly reflected to the process executed in the conflict state, whereby the fair accounting process is made by adjusting a lower performance of the CPU in the conflict state.

To calculate the precise effective time, the CPU information (CPI) tables by the number of combinations between processes may be provided within the accounting information storage unit 11, and the user conversion use time may be calculated employing each ratio.

As another accounting process, the accounting process employing a predetermined weighting value will be described below.

The CPU use time conversion unit 18 extracts the accounting information of the process from the accounting information storage unit 11. As the accounting information, the conflict CPU use time and the non-conflict CPU use time are acquired.

The extracted accounting information is as follows.
Conflict CPU use time=10 [sec]
Non-conflict CPU use time=20 [sec]

The CPU use time conversion unit 18 employs the preset number of logical processors capable of executing the process in the conflict state at the same time, as a weighting value in calculating the CPU conversion use time. Herein, since two logical CPUs are constructed in the SMT processor 130, $$\text{Weighting value} = 1/(\text{number of logical CPUs}) = 1/2 = 0.5$$

And the CPU conversion use time is calculated from the conflict CPU use time.

$$\text{CPU conversion use time} = (\text{conflict CPU use time}) \times (\text{weighting value}) = 10 \times 0.5 = 5 \text{ [sec]}$$

Thereafter, the CPU use time conversion unit 18 stores the accounting information read from the accounting information storage unit 11 and the calculated CPU conversion use time in the accounting calculation information of the accounting calculation information storage unit 13.

FIG. 5 shows an example of accounting calculation information in the table format. The accounting calculation information includes, for each process, the conflict CPU use time (indicated as "conflict" in FIG. 4), the non-conflict CPU use time (indicated as "non-conflict" in FIG. 4), the CPU conversion use time (indicated as "conversion time" in FIG. 4), the total time of conflict CPU use time and non-conflict CPU use time (indicated as "total" in FIG. 4), the effective time to be accounted, and the calculated accounting amount.

The accounting calculation unit 19 calculates the effective time by summing the CPU conversion use time of the accounting calculation information and the non-conflict CPU use time, and calculates the accounting amount by multiplying the effective time by a predetermined accounting unit. Herein, for process p1 as an example, the effective time and the accounting amount are calculated as follows.

$$\text{Effective time} = (\text{CPU conversion use time}) + (\text{Non-conflict CPU use time}) = 5 + 20 = 25 \text{ [sec]}$$

$$\text{Accounting amount} = (\text{effective time}) \times (\text{accounting unit}) = 25 \times 10 = 250 \text{ [yen]}$$

The accounting calculation unit 19 stores the calculated effective time and accounting amount in the accounting calculation information of the accounting calculation information storage unit 13.

In this case, it is only necessary to collect the CPU use time distinctively in the conflict state and the non-conflict state, but the CPU information acquisition unit 17 as shown in FIG. 1 and the processing of step S6 in the processing flow of FIG. 3 are unnecessary. Thereby, the fair accounting process is achieved for the process executed in the conflict state with smaller load.

An accounting process employing the state information of shared resources according to a second embodiment will be described below.

Figure 6:
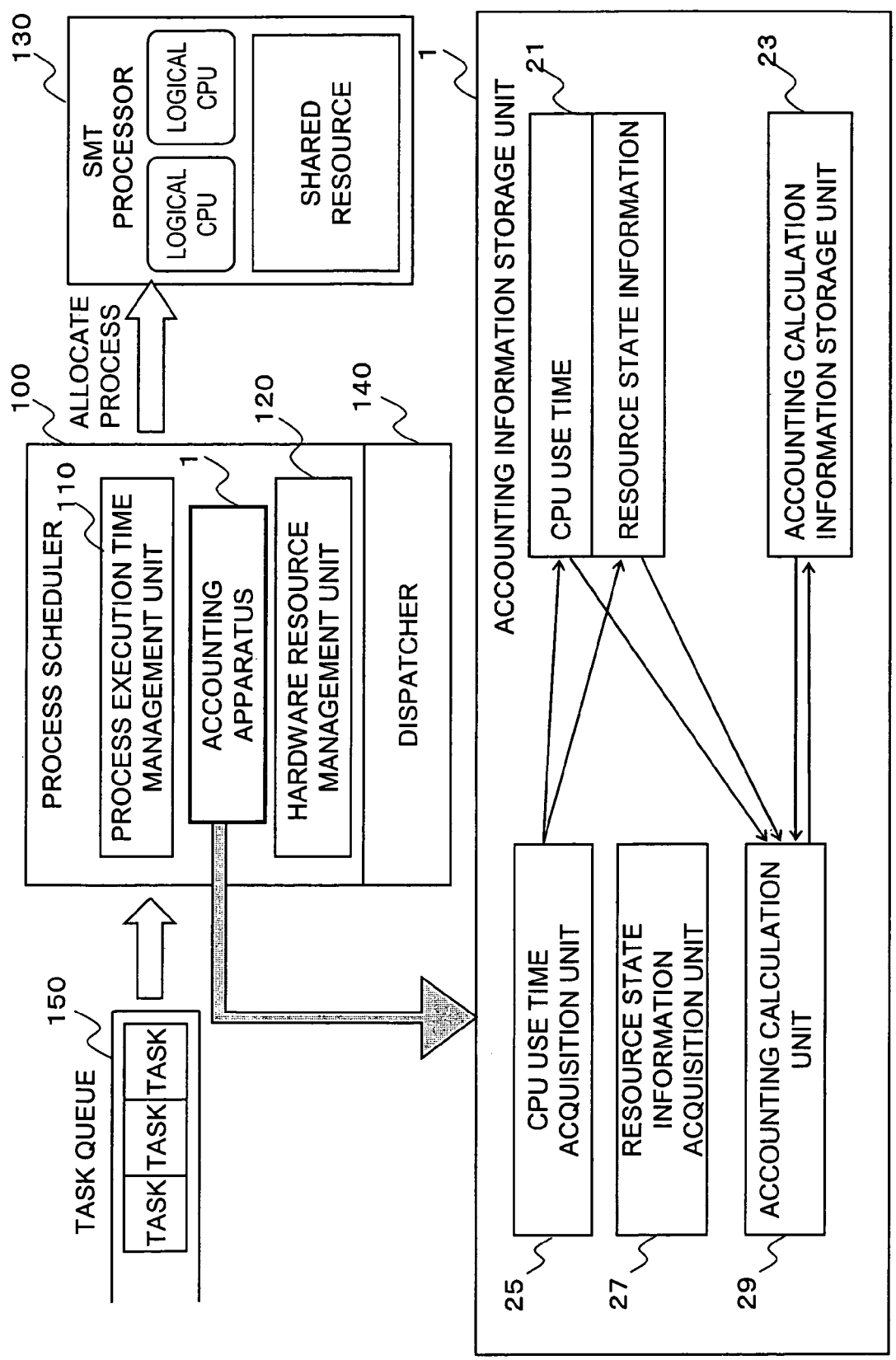
FIG. 6 is a diagram showing a configuration example according to a second embodiment of the invention.

FIG. 6 is a view showing a configuration example according to the second embodiment of the invention. An accounting apparatus 1 of the invention is performed by a program built in a process scheduler 100 of an OS in a computer in the same way as in the first embodiment.

The accounting apparatus 1 comprises an accounting information storage unit 21, an accounting calculation information storage unit 23, a CPU use time acquisition unit 25, a resource state information acquisition unit 27, and an accounting calculation unit 29.

The accounting information storage unit 21 is means for storing, for each process, the accounting information, such as CPU use time, resource state information and other information useful for accounting.

The CPU use time of accounting information is an item of recording the time during which the logical CPU is employed in executing the process of the user program. The resource state information is the information indicating the utilization state of shared resources in the SMT processor 130 when executing each process, for example, an instruction waiting time for each process in each arithmetic operation/processing unit of shared resources.

The accounting calculation information storage unit 23 is means for storing the information required for the accounting process that is employed in the accounting calculation unit 29 and the accounting calculation information that is the result of the accounting process.

The accounting calculation information includes, for each process, the CPU use time, the CPU use time of the process determined as executing in the conflict state, the conversion time of adjusting the CPU use time in the conflict state, the effective time that is the effective CPU use time to be accounted, and the accounting amount calculated based on the effective time.

The CPU use time acquisition unit 25 is processing means for collecting the time during which the logical CPU is employed in executing the process of the user program from the process execution time management unit 110, and storing it in the accounting information storage unit 21.

The resource state information acquisition unit 27 is processing means for collecting the instruction waiting time (number of clock cycles) for each process in each unit of shared resources in the SMT processor 130 from the hardware resource management unit 120, and stores it in the accounting information of the accounting information storage unit 21.

The accounting calculation unit 29 is processing means for calculating the accounting amount, based on the CPU use time in the conflict state and the CPU use time in the non-conflict state, by reading the resource state information of accounting information from the accounting information storage unit 21, determining whether each process of the user program is in the state where another logical CPU is executing the process (conflict state) or not (non-conflict state), and distinguishing the CPU use time read from the accounting information storage unit 21 into the CPU use time in the conflict state and the CPU use time in the non-conflict state.

Figure 7:
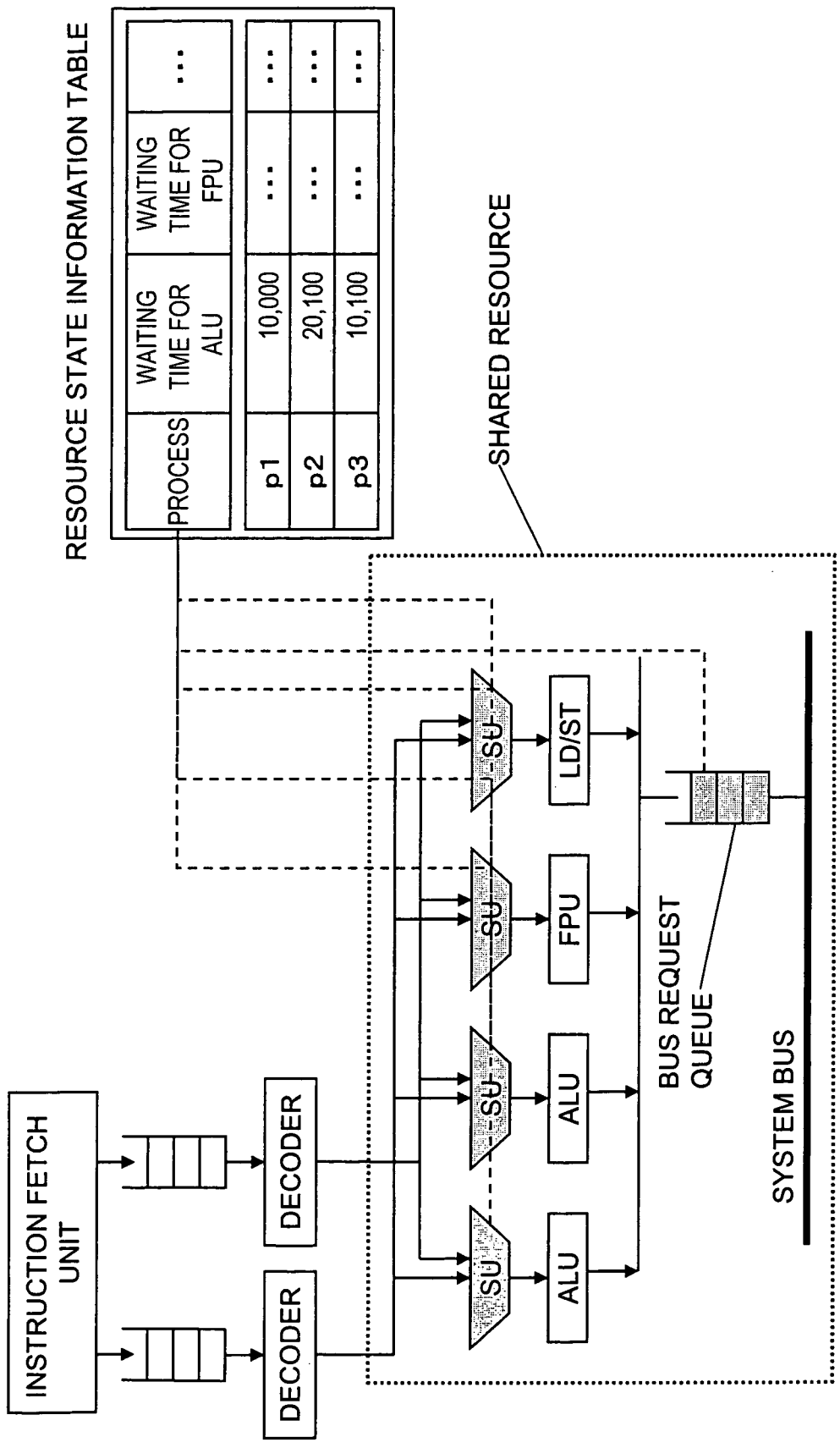
FIG. 7 is a view showing an example of collecting the resource state information for shared resources in the resource state information acquisition unit.

FIG. 7 shows an example of collecting the resource state information of shared resources in the resource state information acquisition unit 27. When the instruction waiting time (number of clock cycles) is employed as the resource state information, for example, the instruction waiting time in an instruction scheduling unit (SU) in each unit of an arithmetic operation unit (ALU), a floating point arithmetic operation unit (FPU) and a load/store unit (LD/ST) is employed. If an instruction is inputted into a necessary unit from an instruction decoder of each of two logical CPUs, the instruction is once accumulated in the SU and then issued. If the instructions of two logical CPUs are inputted into the same unit, the instruction waiting time of the SU till the instruction is actually issued is the information indicating the criterion of the conflict state. For a system bus, the instruction waiting time in a bus request queue is similarly collected.

The resource state information acquisition unit 27 stores the information as listed in the resource state information table of FIG. 7 in the resource state information of the accounting information storage unit 21.

The accounting calculation unit 29 extracts the CPU use time of accounting information in the accounting information storage unit 21 and the resource state information. Herein, the resource state information has the contents of the resource state information table of FIG. 7.

The extracted accounting information is as follows.

CPU use time=24.0 [sec]

In the ALU or FPU of the shared resources in the SMT resource 130, it is not possible to clearly distinguish between the conflict state and the non-conflict state. Thus, the accounting calculation unit 29 determines the CPU use time in executing the process as the CPU use time in the conflict state, considering that the instruction of the process is kept waiting due to conflict if the instruction waiting time in each process of the resource state information exceeds a predetermined time. That is, the time other than the time determined as the CPU use time in the conflict state from the CPU use time of accounting information is defined as the CPU use time in the non-conflict state.

Herein, it is supposed that the time determined as the CPU use time in the conflict state from the instruction waiting time in ALU is "0.5 sec", and the time determined as the CPU use time in the conflict state from the instruction waiting time in FPU is "3.5 sec".

The accounting calculation unit 29 specifies the CPU use time in the conflict state and the non-conflict state as follows.

CPU use time in the conflict state=0.5+3.5=4 [sec]

CPU use time in the non-conflict state=24.0−4=20.0 [sec]

And for the CPU use time in the conflict state, the CPU conversion use time is calculated, employing a predetermined weighting value. Herein, the weighting value employs the preset number of logical processors capable of executing the process in the conflict state at the same time.

Weighting value=1/(number of logical CPUs)=½=0.5

And the CPU conversion use time is calculated from the CPU use time in the conflict state.

CPU conversion use time=(conflict CPU use time)× (weighting value)=4×0.5=2 [sec]

Moreover, the effective time is calculated by summing the CPU conversion use time and the non-conflict CPU use time, and the accounting amount is calculated by multiplying the effective time by a predetermined accounting unit.

Effective time=(CPU conversion use time)+(Non-conflict CPU use time)=2+20=22 [sec]

Accounting amount=(effective time)×(accounting unit)=22×10=220 [yen]

The accounting calculation unit 29 stores the accounting information, the calculated CPU conversion use time, the effective time and the accounting amount in the accounting calculation information of the accounting calculation information storage unit 23.

FIG. 8 shows an example of accounting calculation information in the table format.

The accounting calculation information includes, for each process, the CPU use time in the conflict state calculated employing the instruction waiting time that is the resource state information of each arithmetic operation unit of shared resources (indicated as "CPU time" of "ALU conflict" in FIG. 8), the CPU use time in the non-conflict state in which the CPU use time in the conflict state is subtracted from the CPU use information of accounting information (indicated as "CPU time" of "non-conflict" in FIG. 8), the CPU use time of accounting information (indicated as "total"), the effective time and the accounting amount.

Thereby, the fairer accounting is made by reflecting the utilization state of each unit of the shared resources.

An accounting process according to a third embodiment, employing the information regarding the performance of physical CPU utilized by the process of each user program will be described below.

The third embodiment is performed in the accounting apparatus 1 with the configuration as shown in FIG. 1. In this embodiment, it is supposed that two logical CPUs are operated in the SMT processor 130 at the same time, and its execution contents are process p1 and process p2 of the accounting calculation information as shown in FIG. 4. Also, the CPU information acquisition unit 17 collects CPI as the CPU information, and stores it in the accounting information storage unit 11.

The CPU use time conversion unit 18 extracts the accounting information of the accounting information storage unit 11, and calculates a percentage of the CPU use time of each of the processes p1 and p2 to the CPU use time during which the process is executing.

Ratio of CPU use time of process p1=20% of the entire CPU use time

Ratio of CPU use time of process p2=30% of the entire CPU use time

CPU use time during which two processes conflict=15% of the entire CPU use time

The CPU use time conversion unit 18 calculates the execution times of processes p1 and p2 and the execution times where two processes are in the conflict state as follows, assuming that the entire CPU use time (number of clock cycles) is C.

CPU use time of process $p1=C \times 0.2$

CPU use time of process $p1$ in non-conflict state$=C \times (0.2-0.15)$

CPU use time of process $p2=C \times 0.3$

CPU use time of process $p2$ in non-conflict state$=C \times (0.3-0.15)$

CPU use time in which process $p1$ and process $p2$ are in conflict state$=C \times 0.15$ Moreover, the numbers of executed instructions for the processes p1 and p2 are calculated.

Number of executed instructions for process $p1=(C \times 0.15) \times (1/\text{conflict CPI}) + (C \times 0.2 - 0.15) \times (1/\text{non-conflict CPI})$ Number of executed instructions for process $p2=(C \times 0.15) \times (1/\text{conflict CPI}) + (C \times 0.3 - 0.15) \times (1/\text{non-conflict CPI})$ Herein, it is assumed that the processes p1 and p2 are executed over the entire CPU use time, CPU use time of process $p1=C \times (1/\text{conflict CPI})$
$=0.38 \times C$ CPU use time of process $p2=C \times (1/\text{conflict CPI})$
$=0.32 \times C$ That is, when the process is always executable, the process p1 can execute 3.72 times the number of instructions, and the process p2 can execute 3.58 times the number of instructions from the calculation.

And the substantial CPU use ratio of processes p1 and p2

Substantial CPU use ratio of process $p1=(0.10/0.38) \times 100=26.3\%$

Substantial CPU use ratio of process $p2=(0.09/0.32) \times 100=28.1\%$

The accounting calculation unit 19 calculates the accounting amount based on the preset unit cost of accounting per CPU use ratio, employing the substantial CPU use ratios of processes p1 and p2 calculated by the CPU use time conversion unit 18. Thereby, the accounting is made employing the CPU use ratio at higher precision.

The substantial CPU use ratios of processes p1 and p2 calculated by the CPU use time conversion unit 18 can be employed for a performance prediction process of the SMT processor. For example, in the performance prediction process of the processor, with a conventional simple method of measuring the use ratio, the ratio of the CPU use time of process p1 is 20%, so that the performance prediction is calculated as 5 times. However, it can be found that the ratio of the substantial CPU use time is 26.3%, and the performance prediction is not 5 times but only about 3.8 times. Through the CPU performance prediction process with the substantial CPU use ratio at high precision, a system for warning the user about the load state of CPU more accurately may be constructed, if the measured substantial CPU use ratio is a fixed value or more.

Moreover, the accounting apparatus 1 as described in the above embodiments may have a program utilization accounting calculation unit for calculating the utilization accounting amount of the user program executed in the SMT processor 130, employing the calculated effective use time.

The program utilization accounting calculation unit calculates the utilization accounting amount of the user program distinctively for execution of the user program in the conflict state and execution of the user program in the non-conflict state, based on the CPU use time read from the CPU use time storage unit. Thereby, the accounting can be made for the utilization charge of an application program in the SMT processor.

Though the invention has been described above, various modifications may be made thereto without departing from the spirit or scope of the invention.

For example, in the first embodiment, the CPU use time acquisition unit 15 collects the user use time for each CPU (CPU use time) in each process from the process execution time management unit 110 and stores the collected CPU use time in either the conflict CPU use time or non-conflict CPU use time of the accounting information storage unit 11 in accordance with the set accounting mode. However, the accounting information storage unit 11 may be provided with the entire CPU use time used in the process of the user program, instead of the non-conflict CPU use time, to collect and store the entire CPU use time and the non-conflict CPU use time for each process.

FIG. 9A shows an example of the CPU use time acquisition unit 15 in this case. Also, FIG. 9B shows an example of accounting information in the accounting information storage unit 11. The accounting information includes, for each process, the user use time for each CPU as the entire CPU use time, the conflict user use time for each CPU as the non-conflict CPU use time, and the accounting mode.

What is claimed is:

1. An accounting apparatus for a program, the accounting apparatus comprising:
a memory configured to store a conflict state, a non-conflict state, a conflict time on execution in the conflict state, and a non-conflict time on execution in the non-conflict state; and
a physical processor that operates logical processors that share execution resources of the physical processor and executes a procedure, the procedure comprising:
determining for the program a conflict state of execution in which a logical processor conflicts with any other logical processor or a non-conflict state of execution in which the logical processor does not conflict with any other logical processor for the shared execution resources of the physical processor, and setting either the conflict state or the non-conflict state as a determined result in the memory, when the program starts to be executed in the logical processor;
obtaining time information indicating how long the logical processor is used by the program, and storing a conflict time of execution and a non-conflict time of execution in the memory by referring to the conflict state or the non-conflict state of logical processor in the memory; and
calculating an accounting amount for execution of the program in the conflict state of execution and in the non-conflict state of execution, based on a use time calculated from the stored conflict time of execution and a number of logical processors operated in the conflict time of execution, and based on the stored non-conflict time of execution, after the program is ended,
wherein the physical processor is further configured to calculate a conversion use time that is a substantial use time of executing the program, based on the conflict time of execution, employing a weighting value determined from utilizing a performance index of the logical processors in the conflict state of execution and the non-conflict state of execution.

2. The accounting apparatus according to claim 1, wherein the calculation of the accounting amount calculates an effective use time, based on the conversion use time and the non-conflict time of execution, and calculates the accounting amount from the effective use time in a unit cost of accounting.

3. The accounting apparatus according to claim 2, wherein the number of logical processors executing the program in the conflict state of execution at same time is employed as the weighting value.

4. The accounting apparatus according to claim 1, wherein the weighting value is determined from a ratio of the conflict time of execution to the non-conflict time of execution on basis of the performance index of the logical processors.

5. The accounting apparatus according to claim 1, wherein the information of either a number of clock cycles per instruction or a number of executed instructions per quantum is collected as logical processor information for performance index of a logical processor.

6. The accounting apparatus according to claim 1, wherein the physical processor is further configured to calculate a utilization accounting amount of the program, for execution of the program in the conflict state of execution and execution of the program in the non-conflict state of execution, based on the stored conflict time of execution and the non-conflict time of execution.

7. An accounting apparatus for a program, the accounting apparatus comprising:
a memory; and
a physical processor that operates logical processors that share execution resources of the physical processor and executes a procedure, the procedure comprising:
storing, in the memory, resource state information regarding resource utilization state of a logical processor that is executing the program by indicating how long the logical processor uses hardware resources of the physical processor;
obtaining time information indicating how long the logical processor is used by the program; and
determining for the program a conflict state of execution in which the logical processor conflicts with any other logical processor or a non-conflict state of execution in which the logical processor does not conflict with any other logical processor for the shared execution resources of the physical processor, by employing the resource state information of the logical processor that is executing the program, and calculating an accounting amount for execution of the program in the conflict state of execution and in the non-conflict state of execution, based on a use time, which is calculated from a conflict time of execution and a number of logical processors operated during the conflict time of execution, and based on a non-conflict time of execution, after end of execution of the program,
wherein a conversion use time that is a substantial use time of executing the program is calculated based on the conflict time of execution, employing a weighting value determined from utilizing a performance index of the logical processors in the conflict state of execution and the non-conflict state of execution.

8. The accounting apparatus according to claim 7, wherein the physical processor further calculates an effective use time, based on the conversion use time and the non-conflict state of execution, and calculates the accounting amount from the effective use time in a unit cost of accounting.

9. The accounting apparatus according to claim 8, wherein the physical processor is further configured to calculate a utilization accounting amount of the program, for execution of the program in the conflict state of execution and execution of the program in the non-conflict state of execution, based on a conflict time of execution and a non-conflict time of execution.

10. The accounting apparatus according to claim 7, wherein the resource state information includes a waiting time till an instruction of the program is input into an arithmetic operation unit and/or a processing unit of the hardware resources for the physical processor, when the program is executed in the logical processor,
wherein a weighting value is employed by determining that the program execution is in the conflict state of execution, if the waiting time is a determined time or more.

11. The accounting apparatus according to claim 10, wherein the physical processor further calculates the effective use time, based on the conversion use time and the non-conflict state of execution, and calculates the accounting amount from the effective use time in a unit cost of accounting.

12. The accounting apparatus according to claim 7, wherein the physical processor is further configured to calculate a utilization accounting amount of the program, for execution of the program in the conflict state of execution and execution of the program in the non-conflict state of execution, based on a conflict time of execution and a non-conflict time of execution.

13. An accounting method for a program executed on a computer, comprising:
configuring a computer that includes a physical processor to:
execute logical processors sharing execution resources of the physical processor;
determine for the program a conflict state of execution in which a logical processor conflicts with another logical processor or a non-conflict state of execution in which the logical processor does not conflict with another logical processor for the shared execution resources of the physical processor, when a process of the user program starts to be executed in a logical processor;
obtaining time information indication how long the logical processor is used by the program, and storing a conflict time of execution and a non-conflict time of execution by referring to the conflict state of execution or the non-conflict state of execution; and
calculating an accounting amount for execution of the program according to the conflict state of execution and the non-conflict state of execution, based on a use time, which is calculated from the conflict time of execution and a number of logical processors operated during the conflict time of execution, and based on the non-conflict time of execution, after execution of the program ends,
wherein a conversion use time that is a substantial use time of executing the program is calculated based on the conflict time of execution, employing a weighting value determined from utilizing a performance index of the logical processors in the conflict state of execution and the non-conflict state of execution.

14. An accounting method for a program executed on a computer, comprising:
configuring a computer that includes a physical processor to:
execute logical processors sharing execution resources of the physical processor;
store resource state information regarding resource utilization state of a logical processor that is executing the program;
obtain time information indicating how long the logical processor is used by the program by indicating how long the logical processor uses hardware resources for the physical processor; and
determine for the program a conflict state of execution in which the logical processor conflicts with another logical processor or a non-conflict state of execution in which the logical processor does not conflict with another logical processor for the shared execution resources, by employing the resource state information of the logical processor that is executing the program, and calculate an accounting amount for execution of the program according to the conflict state of execution and the non-conflict state of execution, based on a use time, which is calculated from a conflict time of execution and a number of logical processors operated in the conflict time of execution, and based on a non-conflict time of execution, after end of execution of the program,
wherein a conversion use time that is a substantial use time of executing the program is calculated based on the conflict time of execution, employing a weighting value determined from utilizing a performance index of the logical processors in the conflict state of execution and the non-conflict state of execution.

\* \* \* \* \*